Patented Apr. 2, 1940

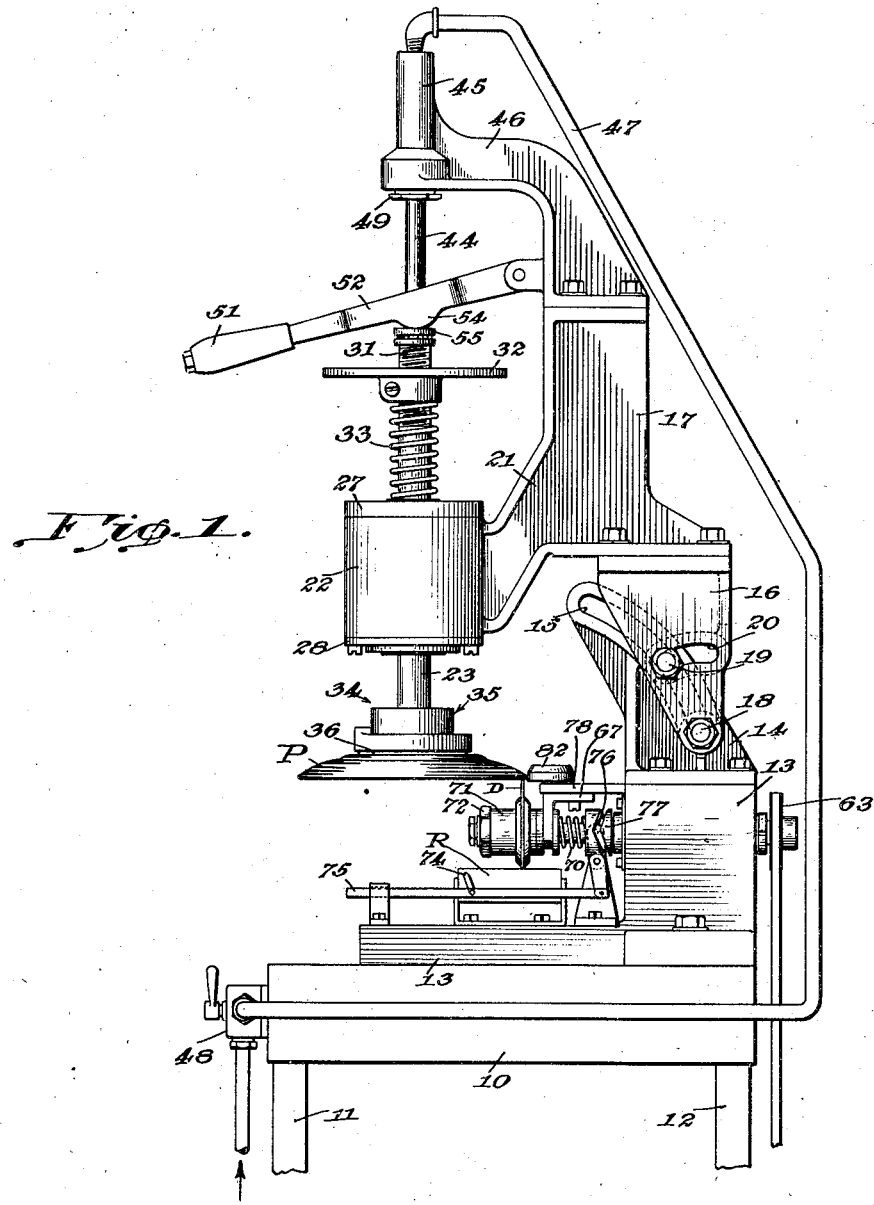

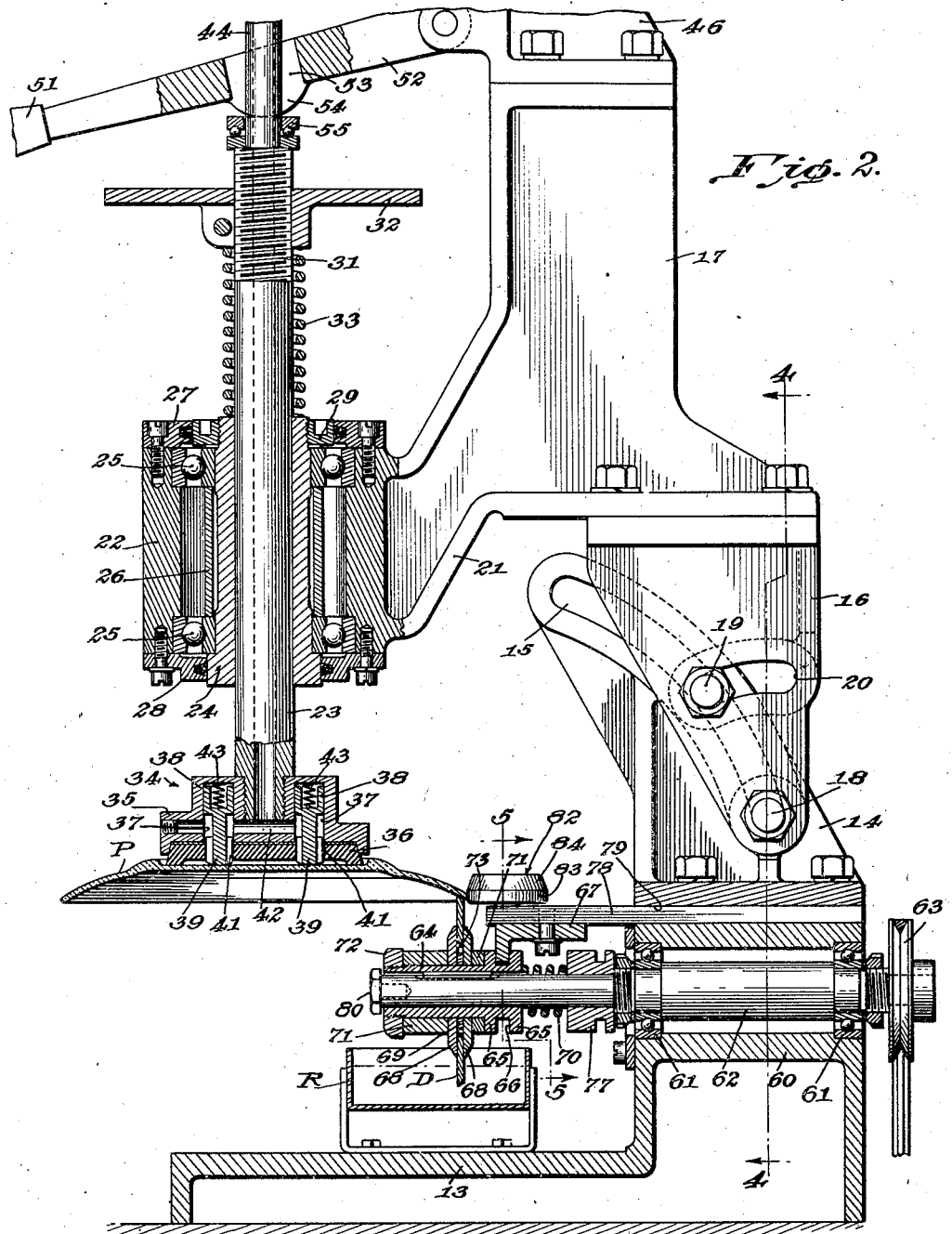

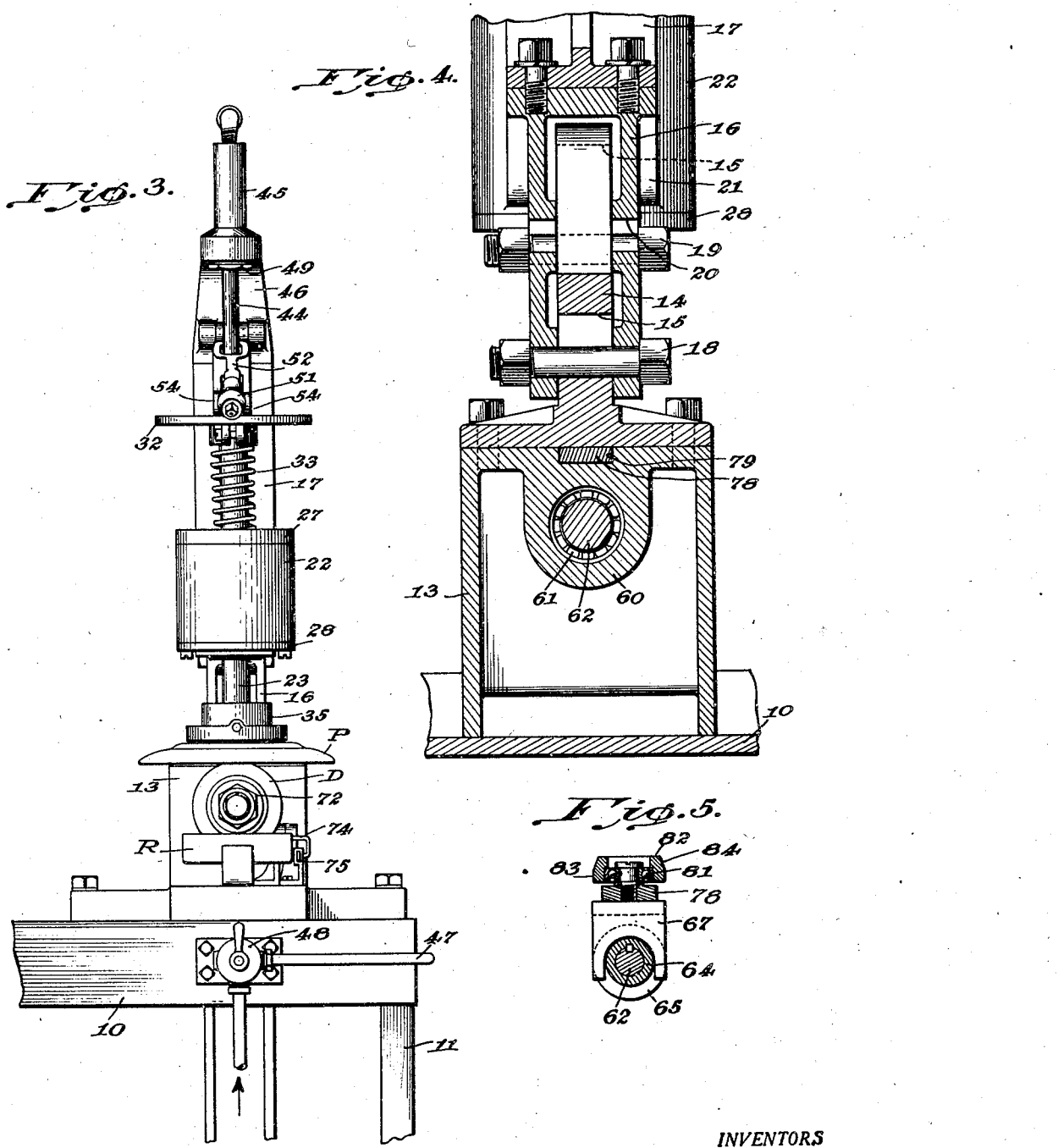

2,196,094

UNITED STATES PATENT OFFICE 2,196,094

BANDING APPARATUS

Edward H. Bennett and Harold R. Schutz, Toledo, Ohio, assignors to Libbey Glass Company, a corporation of Ohio Application October 1, 1937, Serial No. 166,864

6 Claims. (Cl. 91—12)

The present invention relates to banding apparatus and more particularly to a banding machine designed for commercial use in decorating ceramic articles such as plates, dishes, saucers and the like by applying to the peripheral regions thereof a band or series of concentric bands.

The principal object of the invention is to provide an apparatus for banding which will effectively apply to the peripheral regions of the articles being treated a continuous closed band or series of bands in such a manner as to leave no trace of overlap in the band or bands.

Another object of the invention is to provide such an apparatus in which the bands applied to the articles will be uniform in character and will follow the peripheral contours of the articles regardless of any irregularities occurring therein and despite any slight out-of-roundness of the articles.

Yet another object of the invention is to provide a banding apparatus for decorating the circular edge portions of articles which is capable of varied adjustment in order to accommodate articles of different diameters and having different peripheral slopes.

A still further object of the invention is to provide a novel form of article-supporting chuck for supporting the articles undergoing decoration and by means of which the articles may be quickly and easily inserted into the apparatus for decoration and removed therefrom.

Other objects of the invention, not at this time enumerated, will become apparent hereinafter.

In the accompanying drawings:

Fig. 1 is a side elevational view of a banding apparatus constructed in accordance with the principles of the present invention;

Fig. 2 is a fragmentary enlarged side elevational view, partly in section, of the apparatus disclosed in Fig. 1;

Fig. 3 is a fragmentary front elevational view of the apparatus;

Fig. 4 is a sectional view taken substantially along the line 4—4 of Fig. 2; and Fig. 5 is a sectional view taken substantially along the line 5—5 of Fig. 2.

The banding apparatus is in the form of a machine involving in its general organization a support or table 10 (Fig. 1) provided with front and rear supporting legs 11 and 12 respectively. Bolted to the upper surface of the table 10 is a hollow supporting casting 13 (Fig. 2) to which there is bolted an upstanding supporting bracket 14 provided with an upwardly and outwardly inclined arcuate slot 15.

A second bracket 16 which serves to support thereon a chuck supporting standard 17, and which for this purpose is bolted thereto, is mounted for angular adjustment on the bracket 14 by means of a pair of clamping bolts 18 and 19 which extend through both brackets. The bolt 18 extends through the slot 15 and is adjustable therein, while the bolt 19 extends through the slot 15 and through a slot 20 formed in the bracket 16 and is adjustable in both slots. It will be seen, therefore, that by means of the clamping bolts 18 and 19, the height and angular position of the standard 17 may be varied within limits.

The chuck supporting standard 17 is provided with a forwardly and downwardly inclined arm 21 which carries at its forward end a sleeve 22 or hub through which a hollow tubular chuck supporting shaft 23 extends and in which it is rotatably and slidably supported. The shaft 23 is slidably disposed within a sleeve 24 which is mounted in antifriction bearings 25 in the hub 22. The bearings 25 are separated by a spacing sleeve 26. Upper and lower retaining rings 27 and 28 respectively are secured to the hub 22 and serve to retain the bearings 25 in position within the same. The upper end of the sleeve 24 is threaded and receives thereon a spanner nut 29 by means of which the sleeve is retained in the hub assembly against axial movement.

The medial region of the tubular shaft 23 (Fig. 1) is threaded as at 31 and has received thereon a hand-wheel 32. A coil spring 33 disposed between the hand wheel 32 and sleeve 24 serves to normally and yieldingly maintain the shaft 23 in an elevated or raised position.

A chuck assembly 34 (Fig. 2) designed to engage the underneath side of a plate P or other article to be decorated is secured to and suspended from the lower end of the tubular shaft 23 and serves to support the article in an inverted position. The chuck assembly 34 consists of a chuck casing 35 having a rubber vacuum cup 36 secured thereto. The casing 35 has formed therein a pair of parallel extending cylinders 37 in which are slidably disposed a pair of valve members 38 having fingers 39 that project through openings 41 formed in the wall of the casing 35 and vacuum cup 36. The cylinders 37 communicate through a channel 42 with the interior of the hollow shaft 23. Coil springs 43 disposed between the wall of the casing 35 and the valve members 38 serve to normally urge the latter into operative sealing position, i. e., with the valves closing off communication between the cylinders 37 and channel 42 and with the fingers 39 projecting completely through the openings 41.

The upper portion 44 of the shaft 23 above the threaded portion 31 is reduced in diameter and extends telescopically into a vacuum sleeve 45 (Fig. 1) formed on the end of a bracket 46 which is bolted to the standard 17. The vacuum sleeve 45 communicates through a conduit 47 and through a manually operable valve 48 secured to the forward edge of the table 10 with a source of vacuum pressure. A packing gland 49 serves to prevent loss of vacuum pressure within the sleeve 45 upon axial shifting of the upper portion 44 of the shaft 23.

In order to position a plate or other article in the chuck assembly 34, it is merely necessary for the operator of the apparatus to manually position the article against the vacuum cup 36 and to release the same. The underneath side of the article, upon engaging the fingers 39, will cause the valve members 38 to be retracted into the cylinders 37, thus establishing communication between the interior of the vacuum cup 36 and the source of vacuum through the openings 41 and passage 42. Likewise, in order to remove the plate or other article from the chuck assembly 34, it is merely necessary for the operator to manually pull the same from the vacuum cup 36.

The shaft 23 and chuck assembly 34 may be manually lowered by means of a handle 51 formed on the outer end of a lever 52 pivoted to the bracket 46. Toward this end, the lever is slotted as at 53 (Fig. 2) and a pair of cam-like members 54 on opposite sides of the shaft 23 bear against an anti-friction ring 55 which rests upon the threaded portion 31 of the shaft.

Referring now to Fig. 4, an inwardly projecting hub 60 is formed on the casting 13 and serves to rotatably support, by means of antifriction bearings 61 suitably secured in the hub, a banding shaft 62. The rear end of the shaft 62 projects from the casting 13 and has mounted thereon a pulley 63 (Fig. 2) by means of which the shaft 62 is continuously rotated at a constant rate of speed. The forward end of the banding shaft 62 is reduced in diameter and has slidably keyed thereto a sleeve 64, the rear end of which has formed thereon a pair of spaced flanges 65 providing a groove 66 therebetween into which extends the tines of a shifting fork member 67. A coil spring 70 normally urges the sleeve 64 forwardly on the shaft 62 against a thrust screw 80 threaded in the end of the shaft 62. The sleeve 64 has mounted thereon a banding disk D which is in the form of a steel ring, the outer peripheral edge of which has a width corresponding to the width of the band to be applied to the plate P. The disk D is frictionally held between a pair of disks 68 which are clamped to the opposite sides of a hub 69 between a series of spacing rings 71 which are in turn clamped between the innermost flange 65 and a clamping nut 72 threadedly received on the forward end of the sleeve 64. A curved band spring 73 positioned between the hub 69 and disk D permits the latter to yieldingly bear against the inside surface of the plate adjacent the periphery thereof and automatically compensate for any irregularities in the surface against which it bears.

The disk D dips into an enamel composition contained in a reservoir R disposed beneath the same and transfers the enamel composition to the surface of the plate. An agitator bar 74 (Fig. 1) is pivoted to the side walls of the reservoir R and depends into the enamel composition contained therein. The agitator bar 74 is connected to an oscillating lever 75 which is actuated through a pin and slot connection 76 from a cam cylinder 77 mounted on the shaft 62.

The shifting fork member 67 (Fig. 5) is secured to the underneath side of a slide bar 78 which is mounted in a slideway 79 (Fig. 2) formed in the casting 13. The slide bar 78 has rotatably mounted on antifriction bearings 81 at its forward end a spacing roller 82 designed for contact with the peripheral edge of the plate P undergoing decoration and having a cylindrical surface 83 and a tapered surface 84. It will be seen, therefore, that when the chuck assembly 34 is lowered by depressing the handle 51, the peripheral edge of the plate P carried by the vacuum cup 36 will come into contact with the tapered surface 84 of the roller 82 and, by a camming action therewith, will cause the roller 82, together with the slide 78, to be moved radially outwardly from the plate. Such movement of the slide 78 will, through the medium of the fork 67 and grooved sleeve 64, cause the rotating banding disk D also to be moved radially outwardly into contact with the inside surface of the tapered portion or sides of the plate P. The rotating disk D is thus moved into tangential rolling line contact with the edge portions of the plate and, as the plate is rotated by virtue of its contact with the banding disk D, a narrow band of coloring material is applied to the same. Should the periphery of the plate be slightly out-of-round or should any irregularities occur in the peripheral edge of the plate, the roller 82 which rides on the extreme edge of the plate will control the movements of the banding disk radially of the plate so that the applied color band will closely follow the contour of the plate.

Modifications may be resorted to within the spirit of the appended claims. For instance, while a single banding disk D has been disclosed on the shaft 62, it is obvious that plural banding wheels may be employed, it being merely necessary to employ suitable spacing rings 71 for maintaining the disks in their proper relative positions on the shaft 62.

We claim:

1. In a banding machine for applying continuous bands to the edge portions of substantially circular disk-like articles, means for supporting an article for rotation about its central axis, a banding disk mounted for rotation about an axis disposed at an angle to the axis of rotation of the article and capable of limited shifting along its own axis of rotation, means for continually rotating said banding disk, means for supplying decorating material to said disk, means for moving the article bodily axially to establish tangential rolling contact between the peripheral regions thereof and the peripheral edge of said banding disk, and means contacting the peripheral edge of the article for shifting the position of said banding disk.

2. A banding machine comprising a rotatable shaft, a banding disk on said shaft and rotatable therewith, means for supplying decorating material to said disk, a second rotatable shaft substantially perpendicular to said first mentioned shaft, said second shaft being movable axially, a chuck carried by said second shaft for supporting a substantially circular disk-like article for rotation about the axis of said second shaft with the peripheral regions thereof intersecting the plane of said disk, means for moving said second shaft axially, and means for rotating said first mentioned shaft.

3. A banding machine for applying bands to the peripheral edge portions of plates, dishes and the like comprising a shaft mounted for rotation about a horizontal axis, a banding disk slidably keyed to said shaft, means for supplying decorating material to said disk, means for supporting an article to be decorated for rotation about a substantially vertical axis with its peripheral regions in contact with the periphery of said disk, a roller in tangential rolling contact with the periphery of said article, means connecting the roller and disk whereby lateral shifting of said roller causes lateral shifting of said disk, and means for continuously rotating said shaft.

4. A banding machine for applying bands to the peripheral edge portions of plates, dishes and like articles comprising a shaft mounted for rotation about a horizontal axis, a banding disk slidably keyed to said shaft, means for supplying decorating material to said disk, a rotatable chuck for supporting an article to be decorated with its peripheral regions intersecting the plane of said banding disk, a slide member, a horizontal slideway for said slide member, a roller carried by said slide member and connected to said disk, said roller having a tapered surface normally in vertical alignment with the peripheral edge of said article, means for moving said chuck vertically to bring the peripheral regions of the article into contact with said disk and the peripheral edge thereof into contact with said roller, and means for rotating said shaft.

5. In a banding machine for applying continuous bands to the edge portions of disk-like articles, means for supporting an article for rotation about its central axis, a banding disk mounted for rotation about an axis disposed at an angle to the axis of rotation of the article and capable of limited shifting along its own axis of rotation, means for continually rotating said banding disk, means for supplying decorating material to the disk, means for establishing relative movement bodily between the article and disk toward each other to bring the peripheral regions of the article and the periphery of the disk into contact, and means contacting the peripheral edge of the article for shifting the position of said banding disk.

6. In a banding machine for applying continuous bands to the edge portions of disk-like articles, a rotatable shaft, a banding disk slidably keyed to the shaft and rotatable therewith, means for supplying decorating material to the disk, a second rotatable shaft disposed at an angle to the first shaft, a chuck on said last mentioned shaft for supporting an article to be decorated with its peripheral regions intersecting the plane of the banding disk, means for establishing relative movement bodily between said shafts to bring the peripheral regions of the article and the periphery of the disk into contact, means contacting the peripheral edge of the article for shifting the position of the disk on said first mentioned shaft, and means for continuously rotating one of said shafts.

EDWARD H. BENNETT.
HAROLD R. SCHUTZ.